Patented Mar. 3, 1931

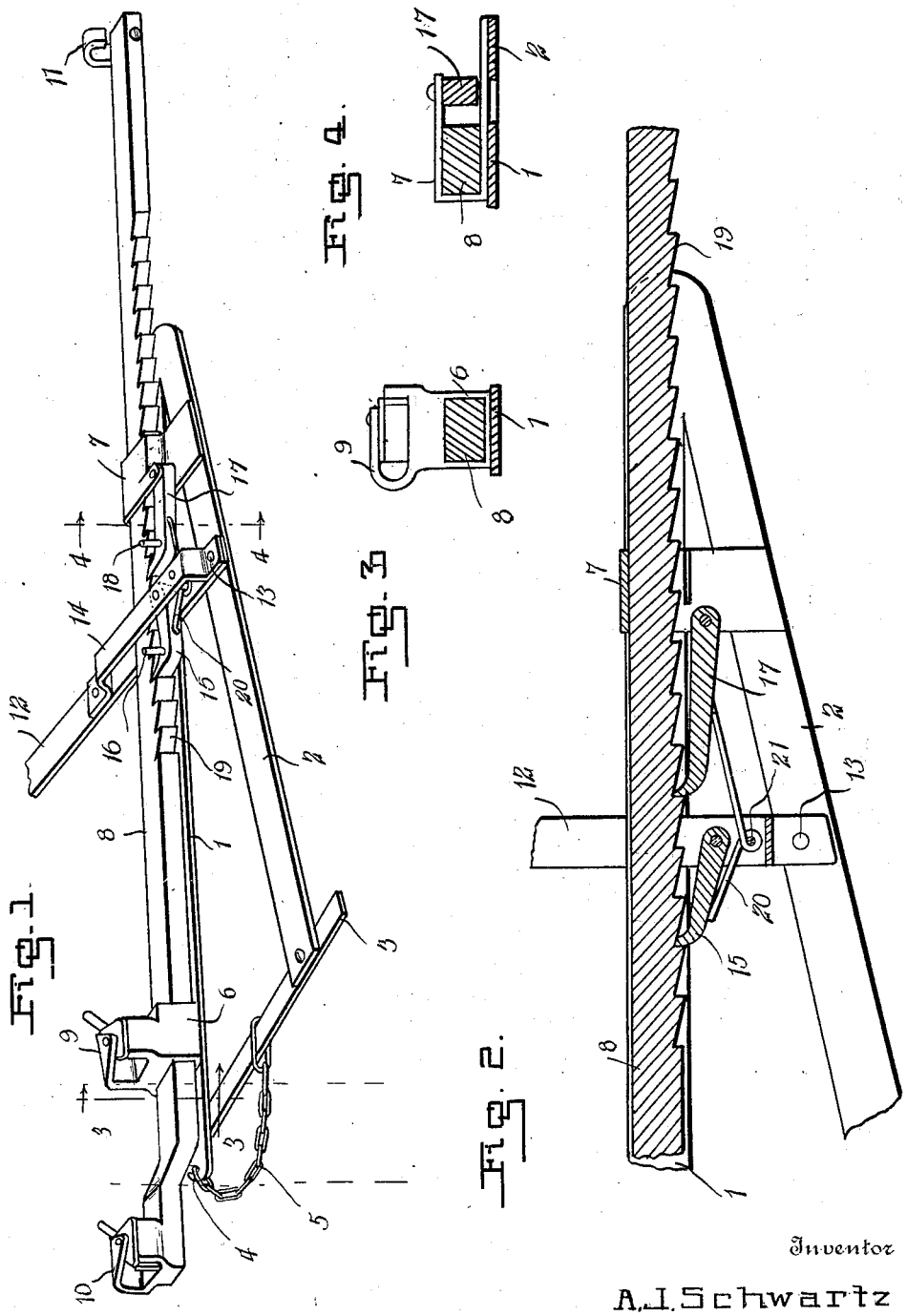

1,794,488

UNITED STATES PATENT OFFICE

ALLIE J. SCHWARTZ, OF FOWLER, KANSAS

WIRE STRETCHER

Application filed July 3, 1928. Serial No. 290,065.

The construction of wire fencing entails the stretching of the runner or longitudinal wires to prevent any sagging in the fence and to secure a proper tensioning thereof.

The present invention provides a tool of simple construction, a few number of parts and readily operable and movable from one position to another as occasion may require in the setting up and stretching of the fence.

While the drawing illustrates a preferred embodiment of the invention, it is to be understood that in adapting the means to meet specific needs and requirements, the design may be varied and such changes in the minor details of construction may be resorted to within the scope of the invention as claimed, without departing from the spirit thereof.

For a full understanding of the invention and the merits thereof, reference is to be had in the following description and the drawing hereto attached, in which:—

Figure 1 is a perspective view of a wire stretcher embodying the invention.

Figure 2 is an enlarged detail sectional view of a portion of the tool.

Figure 3 is a detail sectional view on the line 3—3 of Figure 1 looking in the direction of the arrows.

Figure 4 is a detail sectional view on the line 4—4 of Figure 1 looking in the direction indicated by the arrows.

Corresponding and like parts are referred to in the following description and designated in the several views of the drawing by like reference characters.

The tool includes a frame, an intermittently actuated stretcher bar, operating means for imparting an intermittent movement to the stretcher bar, and clamps for holding the wire when the tool is in operation.

The frame includes a main bar 1, a brace 2 and a cross bar 3, the latter being at the end of the frame which is adapted to abut the fence post or other support to sustain the frame when the tool is in action. The main bar 1 projects a short distance beyond the cross bar 3 and is formed with a hook 4 to engage the links of a chain 5 provided to secure the tool to a fence post or other support. One end of the chain 5 loosely engages the cross bar 3 and after the chain has been passed around the fence post a link thereof engages the hook 4, as indicated most clearly in Figure 1 of the drawing. Guides 6 and 7 project laterally from the main bar 1 and receive the stretcher bar 8 which is slidable therein and retained in place thereby. A wire clamp 9 is mounted upon the guide 6 and a similar wire clamp 10 is mounted upon an end of the bar 8. The forward end of the stretcher bar 8 is offset to bring the two wire clamps 9 and 10 in line. A guide 11 is provided adjacent the rear end of the stretcher bar 8 and is adapted to engage over the wire to be stretched so as to support the rear part of the tool. The wire clamps 9 and 10 may be of any preferred construction.

The operating lever 12 is pivoted at one end to the brace 2 as indicated at 13 and passes between the bars 1 and 8. A keeper 14 extends over the bar 8 and its offset ends are secured to the lever 12. A dog 15 is pivoted at one end to the lever 12 and keeper 14. A pin 16 projects laterally from the active end of the dog 15. A dog 17 is pivoted at one end to the guide 7 and a pin 18 projects laterally therefrom. The stretcher bar 8 is provided along a side with a plurality of teeth 19 to coact with the dogs 15 and 17. When the lever 12 is actuated the dog 15 is moved forward and backward. Upon the forward movement of the dog 15 the bar 8 is advanced and upon the backward movement of the dog 15 the dog 17 prevents rearward movement of the bar 8 and holds it in the advanced position. A double ended spring 20 carried by the lever 12 normally exerts a pressure upon the dogs 15 and 17 to hold them in engagement with the teeth 19 of the stretcher bar 8. The spring 20 is mounted intermediate its ends upon a pin 21 supported at its ends in the lever 12 and keeper 14. The dog 17 functions as a detent and is of a length to admit of the rear end of the spring 20 riding thereon as the lever 12 is oscillated.

The tool is placed in operative position by engaging the cross bar 3 with a side of a fence post and securing it thereto by means of the chain 5 or like part. The wire to be stretched is engaged with the guide 11 and held by the clamp 10. Upon oscillating the lever 12 the bar 8 is moved forwardly and draws the wire held by the clamp 10. Should the wire not be drawn sufficiently tight when the bar 8 reaches the limit of its forward movement the wire is engaged by the clamp 9 and released from the clamp 10. Both dogs 15 and 17 are moved away from the teeth of the bar to admit of drawing said bar backward after which the wire is engaged with the clamp 10 and released from the clamp 9 and the lever 12 is oscillated to further stretch the wire, which when properly tensioned is made fast and the tool removed and readjusted to the next wire to be stretched.

Having thus described the invention, I claim:—

A wire stretcher comprising a frame including a longitudinal bar, a cross bar and a brace, the longitudinal bar projecting beyond the cross bar and terminating in a hook, a chain having one end slidably engaging the cross bar between the longitudinal bar and brace and adapted to have its opposite end adjustably engage the said hook, a toothed bar held to and slidable on the longitudinal bar and having a wire clamp at its forward end and a guide at its rear end, an operating lever pivoted to the brace portion of the frame and passing between the longitudinal and toothed bars, a keeper secured at its ends to the lever and extending across the toothed bar, spring held dogs on the lever and frame to coact with the toothed bar, and a wire clamp adjacent the forward end of the beforementioned longitudinal bar.

In testimony whereof I affix my signature.

ALLIE J. SCHWARTZ. [L. S.]